C. F. OVERLY.
STRAINER.
APPLICATION FILED MAY 13, 1912.

1,053,131. Patented Feb. 11, 1913.
2 SHEETS—SHEET 1.

WITNESSES:

INVENTOR
Charles F. Overly
by Christy & Christy
Atty's

C. F. OVERLY.
STRAINER.
APPLICATION FILED MAY 13, 1912.

1,053,131.

Patented Feb. 11, 1913.
2 SHEETS—SHEET 2.

WITNESSES:
J. Herbert Bradley.
Francis J. Tomasson

INVENTOR
Charles F. Overly
by Christy & Christy
Atty

UNITED STATES PATENT OFFICE.

CHARLES F. OVERLY, OF PITTSBURGH, PENNSYLVANIA, ASSIGNOR TO THE LAGONDA MANUFACTURING COMPANY, OF SPRINGFIELD, OHIO, A CORPORATION OF OHIO.

STRAINER.

1,053,131.     Specification of Letters Patent.     Patented Feb. 11, 1913.

Application filed May 13, 1912. Serial No. 696,860.

*To all whom it may concern:*

Be it known that I, CHARLES F. OVERLY, residing at Pittsburgh, in the county of Allegheny and State of Pennsylvania, a citizen of the United States, have invented or discovered certain new and useful Improvements in Strainers, of which improvements the following is a specification.

My invention relates to strainers used, usually in connection with water conduits, to remove the larger particles of whatever solid matter may be carried by the water flowing through such conduits.

The objects of my invention are to provide an improved means for cleaning such strainers, and to provide a means for removing smaller particles, such as sand, from the water when passing through the strainer structure.

A further object of my invention is to provide an efficient and easily operated strainer of simple and durable construction.

Figure 1:
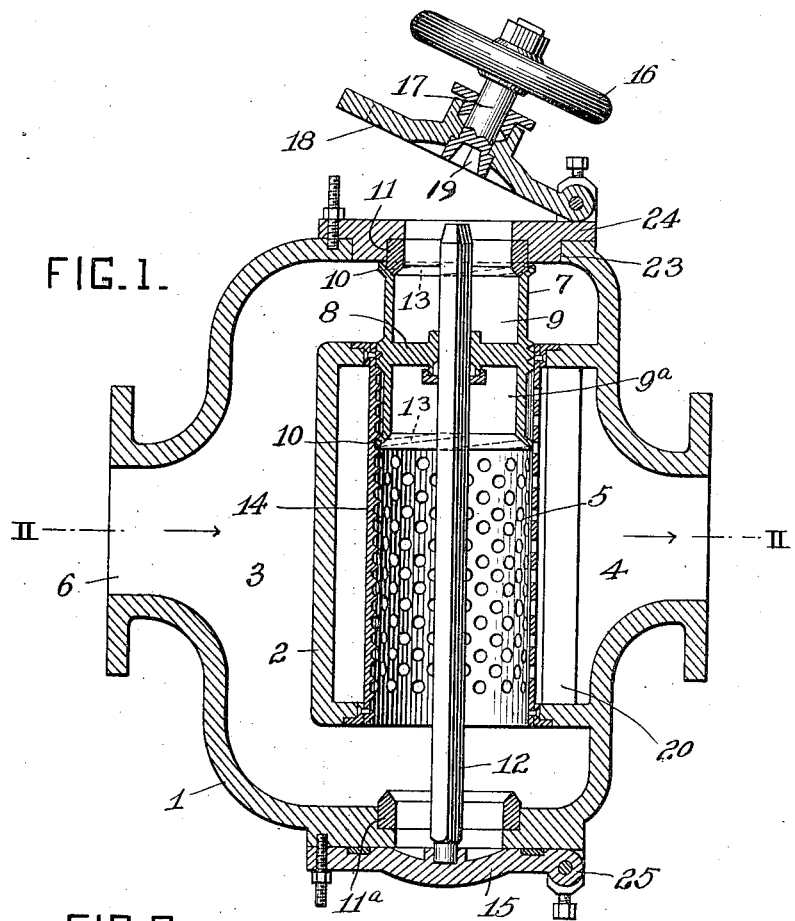
Figure 2:
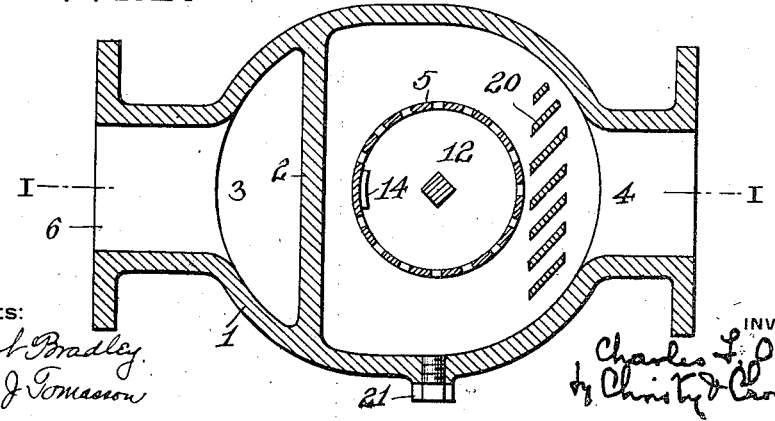
Figure 3:
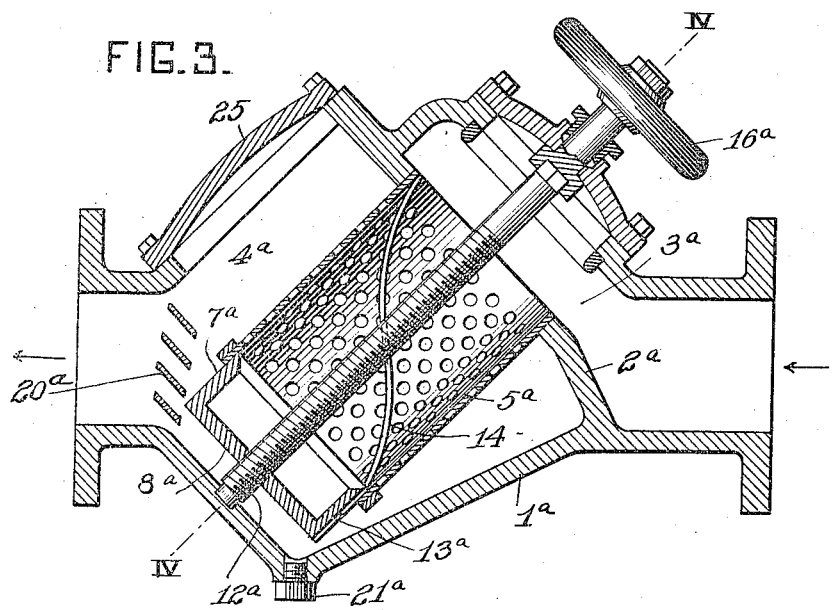
Figure 4:
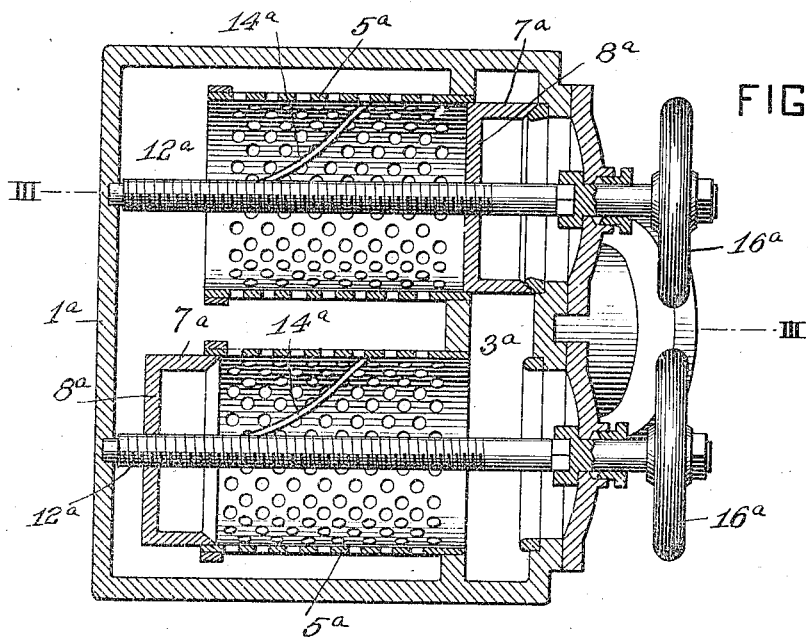

In the accompanying drawings, which illustrate my invention, and form part of my specification, Figure 1 is a longitudinal sectional view of a single basket strainer; Fig. 2 is a sectional view taken on the line II—II, Fig. 1; Fig. 3 is a longitudinal sectional view of a double basket strainer, the plane of section being partially indicated by the broken line III—III, Fig. 4; and Fig. 4 is a sectional view taken on the line IV—IV, Fig. 3.

The preferred embodiment of my invention is illustrated in Figs. 1 and 2, wherein is shown a single basket strainer consisting of a casing 1, provided with a partition 2, dividing the casing into an inlet chamber 3 and an outlet chamber 4. A strainer-basket 5, which may be cylindrical in form, is secured preferably to the partition 2 as shown, the said basket extending through the outlet chamber 4 and opening at each end to the said inlet chamber 3. In this construction, water, or any other liquid to be strained, passes through the inlet orifice 6 into the inlet chamber 3, and from thence into one or both ends of the basket 5, depending upon the position of the cleaner, as will be explained hereafter. The water then flows through the holes in the strainer, which holes may be of any desired size, and the larger particles of solid matter carried by the water will be caught by and retained within the strainer.

In order to remove the solid matter held in the basket 5, I preferably provide a cleaner, adapted to move longitudinally through the said basket, and to carry such solid matter to clean-out openings in the casing. The cleaner, which may be of any desired form, as shown herein consists of a cylinder 7, divided by a partition 8 into two cup-shaped dirt-receiving chambers 9 and 9ª. At each end of the cylinder 7 a flanged portion 10 may be provided, each flange being so formed as to cut dirt from the interior of the basket, and also to be seated against a seating ring 11. The longitudinal movement of the cleaner 7, 8 through the basket 5 is preferably accompanied by a rotary movement thereof. To such an end an angular rod 12 may pass slidably through the center of the partition 8, and the cylinder 7 may be provided externally with a helically arranged thread 13, adapted to be engaged by serrations or teeth 14 formed on the gasket 5, as shown. The rod 12 may be rotatably mounted in the clean-out cover 15; and the rotation thereof may be effected by means of a suitable hand wheel 16, rigidly secured to a shaft 17. The said shaft may be rotatably mounted in the clean-out cover 18, and may have a suitable shoulder 19 adapted to engage the end of said rod 12.

Aside from removing the larger particles of matter from water, I also provide means for the removal of sand from water after the water has passed through the strainer-basket. To such an end, I preferably provide, in the outlet chamber 4, a series of baffle plates 20 extending in a general horizontal direction from one side to the other of the casing. Such baffle plates slope downward and toward the basket 5. When water, passing through the said basket, strikes the baffle plate 20, the heavier particles of sand, carried by the water, instead of being carried along with the water will roll down the baffle plates 20 and settle in the bottom portion of chamber 4, from which they may be removed from time to time through a suitable drain opening 21.

In constructing the above described strainer, the casing 1 and the partition 2 may be cast integrally; and the seating ring 11ª, basket 5, and cleaner 7, 8 may be let into the casing through the opening 23, to which the ring 24 may be afterward secured. The clean-out cover 15 may be hinged to the casing 1, as at 25; and the clean-out cover 18 may be hinged to the ring 24 as shown.

In practice it is desirable to so arrange the strainer that the axis of the rod 12 will lie in a general horizontal direction. When the parts are in the position indicated in Fig. 1, water will flow into the lower end of the basket 5 and from thence into the outlet chamber 4. By closing the cover 18 and rotating the wheel 16 the cleaner 7, 8 will be rotated and will move longitudinally through the basket 5. By such a movement of the cleaner the dirt or solid matter caught in the said basket will be cut therefrom and will be retained in the chamber 9ª, the flange 10 of which, at the end of the movement of the cleaner, will be seated against the ring 11ª. Dirt may then be removed from the chamber 9ª by opening the cover 15; and, in this position of parts, it will be understood that the flow of water into the basket 5 is through the upper end thereof.

In the form of my invention illustrated in Figs. 3 and 4, the casing 1ª is divided by the partition 2ª into an inlet chamber 3ª and an outlet chamber 4ª. In the partition 2ª, two baskets 5ª are mounted, and a cup-shaped cleaner 7ª, 8ª is arranged to move longitudinally and rotatably through each of the said baskets. The longitudinal movement of each cleaner 7ª, 8ª may be effected by means of a threaded rod 12ª, which may have screw-thread engagement with the bottom portion 8ª of the said cleaner, and which may be rotated by means of a hand wheel 16ª, substantially in the same manner as described in connection with the form of invention illustrated in Figs. 1 and 2. The rotary or helical motion of the said cleaner may be effected by providing a helical rib 14ª upon the basket 5ª and a corresponding groove 13ª upon the wall portion 7ª of the said cleaner. The baffle plates 20ª may be arranged in the outlet chamber 4ª, as is indicated in Fig. 3, and a suitable drain opening 21ª may be provided in the bottom of the casing 1ª. In constructing the strainer shown in Figs. 3 and 4, the casing 1ª and partition 2ª may be cast integrally; and the strainer-baskets 5ª, as well as the cleaners 7ª, 8ª, may be let into the said casing through a suitably provided opening 25. The operation of this form of strainer will be clearly understood from the operation, already described, of the form of strainer shown in Figs. 1 and 2.

It will be apparent to those skilled in the art that many changes may be made in the form and construction of the strainers illustrated herein without departing from the spirit of my invention.

I claim as my invention:

1. In a strainer, the combination with a casing provided with inlet and outlet chambers, of a strainer-basket between the said chambers, a clean-out opening, a cup-shaped cleaner and dirt-receiver movable through the said basket, and means for moving the said cleaner, substantially as described.

2. In a strainer, the combination with a casing provided with inlet and outlet chambers, and a strainer-basket extending between the said chambers and having a clean-out opening at one end of the said basket; of a concave cleaner movable through the said strainer-basket, the said cleaner being effective to retain dirt removed from the surface of the said basket and to convey such dirt to the said opening, substantially as described.

3. In a strainer, the combination with a casing provided with inlet and outlet chambers, of a strainer basket having communication at each end thereof with the said inlet chamber, and means for removing dirt from the said basket, substantially as described.

4. In a strainer, the combination with a casing provided with inlet and outlet chambers, of a strainer-basket opening at each end to the said inlet chamber, a double cup-shaped cleaner and dirt receiver movable through the said basket, and means for moving the said cleaner.

5. In a strainer, the combination of a casing, a partition dividing the said casing into inlet and outlet chambers, a strainer-basket secured to the said partition and extending through the said outlet chamber, said strainer opening at each end into the said inlet chamber and means for removing dirt from the interior of the said strainer.

6. In a strainer, the combination of a casing, a partition dividing the said casing into inlet and outlet chambers, a strainer-basket extending through the said outlet chamber and opening at each end to the said inlet chamber, an angular rod extending through the said basket, a double cup-shaped cleaner and dirt-receiver slidably mounted upon the said rod and movable through the said basket, and a clean-out opening adjacent to each end of the said basket, substantially as described.

In testimony whereof I have hereunto set my hand.

CHARLES F. OVERLY.

Witnesses:
PAUL N. CRITCHLOW,
JAMES C. MURDOCH.